United States Patent [19]

Tsutsumi

[11] 4,438,064
[45] Mar. 20, 1984

[54] INJECTION MOLDING PROCESS FOR SYNTHETIC RESIN AND ITS APPARATUS

[76] Inventor: Shigeru Tsutsumi, Yonezawa, Japan

[21] Appl. No.: 440,569

[22] Filed: Nov. 10, 1982

[30] Foreign Application Priority Data

Nov. 20, 1981 [JP] Japan .............................. 56-185450

[51] Int. Cl.³ ............................ B29F 1/03; B29F 1/08
[52] U.S. Cl. ................................. 264/328.15; 425/548; 425/549
[58] Field of Search ........................ 425/549, 564–566, 425/548; 264/328.15

[56] References Cited

U.S. PATENT DOCUMENTS

| 3,945,535 | 3/1976 | Leiste ............................. 425/549 X |
| 4,125,352 | 11/1978 | Gillert ................................. 425/566 |
| 4,306,852 | 12/1981 | Mateev ................................. 425/549 |
| 4,373,132 | 2/1983 | Vartanian .................. 264/328.15 X |

FOREIGN PATENT DOCUMENTS

| 43234 | 1/1982 | European Pat. Off. ............ 425/549 |
| 51-19050 | 2/1976 | Japan .................................. 425/549 |

Primary Examiner—Thomas P. Pavelko
Attorney, Agent, or Firm—Kramer and Brufsky

[57] ABSTRACT

This invention relates to an injection molding process for synthetic resin and its apparatus which enable to produce highly precise molded articles and shorten the molding time. More particularly, by actuating a forcible cooling means disposed in a runner and extended into a gate, the fused resin in the gate is cooled and solidified locally, thereby the gate is closed. On the other hand, by stopping the forcible cooling means, the solidified resin in the gate is heated and fused by a heater mounted either inwardly of a runner or outwardly thereof.

4 Claims, 11 Drawing Figures

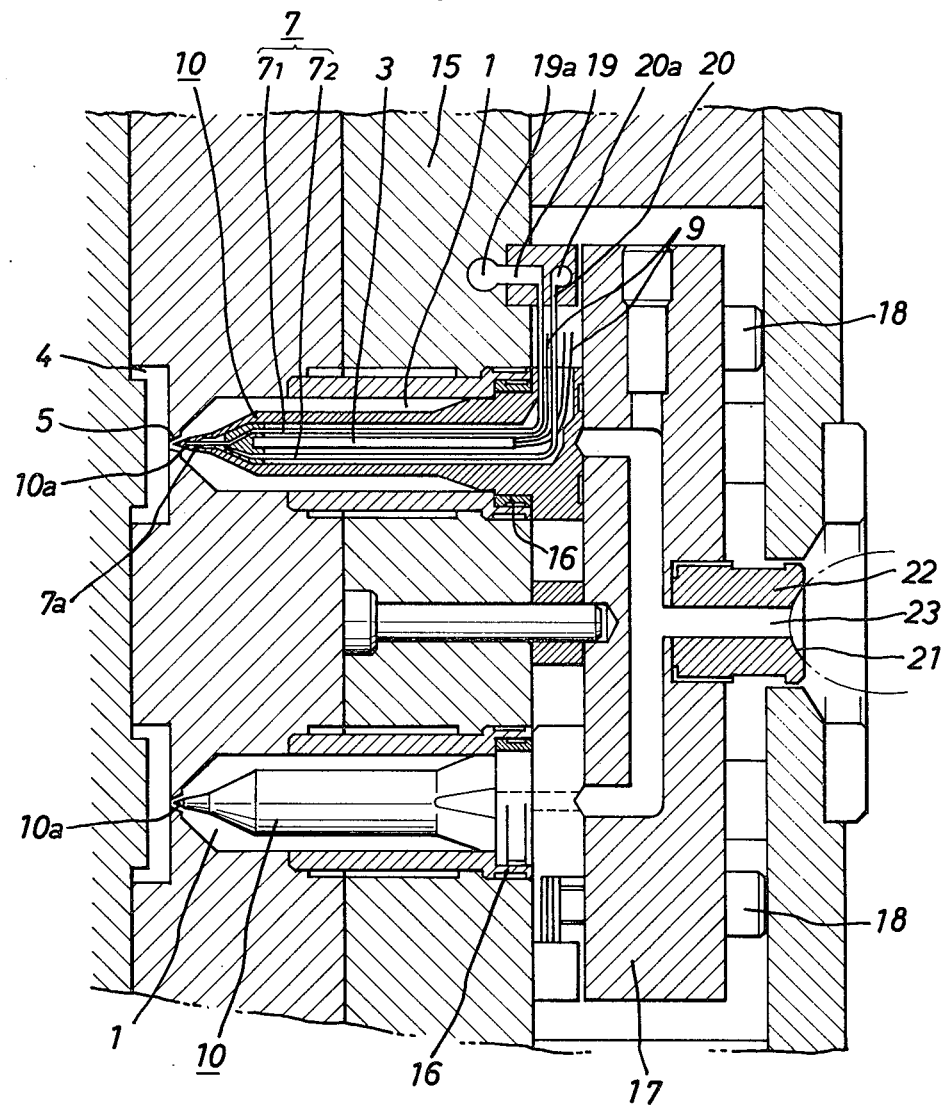

INJECTION MOLDING PROCESS FOR SYNTHETIC RESIN AND ITS APPARATUS

BACKGROUND OF THE INVENTION

This invention relates to an injection molding process for synthetic resin and its apparatus, wherein a gate communicating with a cavity is cooled forcibly to solidify the synthetic resin in the gate after each injection molding operation, thereby the gate is closed.

Generally, synthetic resin injection molding machines of this sort are of a sprue runner type and a sprue runnerless type. The precision injection molding is mainly of the former type. However, the injection molding of this type is forced to consume sprue runners as scraps, so that it becomes a wasteful consumption of material and disadvantageous in view of the energy saving policy.

According to the sprue runnerless type injection molding, the exterior and interior of the runner are constantly heated by a heater in order to prevent the synthetic resin in the runner from cooling and solidifying. Therefore, it is avoided to consume the material wastefully. However, the inconvenience of it is that since the synthetic resin in the gate communicating with the cavity is subject to a back pressure by a return movement of a plunger means for the injection molding, so that it may flow back into the runner. Thus, the molding accuracy is bad and the molded articles may be deformed or not uniform in shape. On the other hand, to prevent this back flow, it is required to maintain the inner pressure of the cavity until the fused resin within the cavity is solidified. However, the inconvenience is that the molding time becomes prolonged.

For the purpose of eliminating such inconveniences of the conventional art, the present Applicant proposes novel injection molding methods and apparatus particularly in Japanese Patents 762148, 916450, 902601 (the corresponding U.S. Pat. No. 3,800,027), etc. According to one aspect of the new techniques disclosed in the aforesaid patents, an intermittent heater is disposed in a gate, thereby the synthetic resin in the gate is fused by the intermittent heater and injected in the cavity. Due to stoppage of the heating operation, the fused resin in the gate is radiated and solidified, thereby the fused resin in the cavity is prevented from flowing back into the runner. Thus, a wasteful consumption of the material is avoided and a suitable mold operation is realized.

BRIEF SUMMARY OF THE INVENTION

It is a general object of this invention to provide an injection molding process for synthetic resin and its apparatus which enable to produce highly precise molded articles and shorten the molding time.

According to an outstanding aspect of this invention, by actuating a forcible cooling means disposed in a runner and extended into the gate, the fused resin in the gate is cooled and solidified locally, thereby the gate is closed. On the other hand, by stopping the forcible cooling means, the solidified resin in the gate is heated and fused by a heater mounted either outwardly of a runner or inwardly thereof.

These and other objects and advantages of this invention will become apparent from the following description of examples with reference to the accompanying drawings.

BRIEF DESCRIPTION OF THE DRAWINGS

FIG. 7 is a vertical section view of a main part according to a further example of this invention.

PREFERRED EXAMPLES OF THE INVENTION

Figure 1:
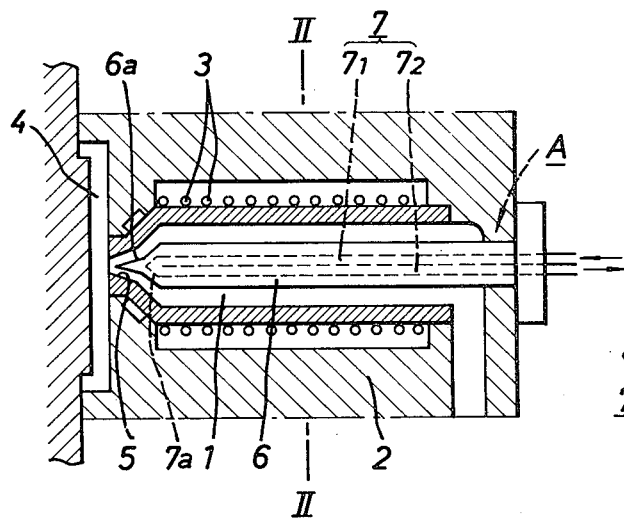
FIG. 1 is a vertical section view of a main part of an injection molding apparatus for synthetic resin according to this invention.
Figure 2:
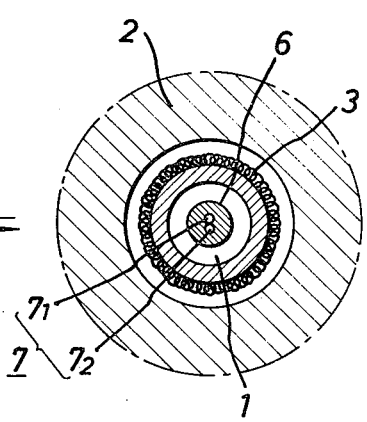
FIG. 2 is a front view taken on line II—II of FIG. 1.

A preferred example of this invention will now be described with reference to FIGS. 1 and 2. This example provides a sprue runnerless type injection molding in which each molded article has no sprue runner as a waste material.

Numeral 1 denotes a runner formed in an outer cylinder body 2. Numeral 3 denotes a heater disposed in the outer cylinder body 2 or along the external periphery of the runner 1.

Numeral 6 denotes a projectile cooling cylinder which is disposed in a longitudinal direction within the runner 1. A front end 6a of the projectile cooling cylinder 6 is pointed and extended into the gate 5. Thus, a forcible cooling means A is formed. The projectile cooling cylinder 6 is provided therein with a cooling channel 7. Thus, the cooling function of the forcible cooling means A is carried out effectively by a front end of the cooling channel 7 or the front end 6a of the projectile cooling cylinder 6.

Preferably, the front end 6a is to be cooled effectively, but the other part of the cooling cylinder 6 is preferably to be provided with a heat insulation arrangement.

The cooling channel 7 consists of a cooling medium advancing path $7_1$ and a cooling medium returning path $7_2$ along a center axis of the projectile cooling cylinder 6. Numeral 7a denotes a curved portion formed inside the front end 6a. The advancing path $7_1$ may be connected to the returning path $7_2$ by way of a pipe conduit (not illustrated).

The operation of the apparatus according to this invention will now be described.

A certain quantity of fused synthetic resin are injected into the cavity 4 through the runner 1 and the gate 5 by means of an injection mold means (not illustrated).

The heater 3 constantly heats and fuses the synthetic resin in the runner 1 as well as in the gate 5, thereby the injection molding is operable. As soon as the fused resin is filled into the cavity 4 by completion of the injection molding operation, the forcible cooling means A is actuated. Next to this, when supplying a preferred cooling medium such as e.g. water, air or other fluid into the cooling channel 7 of the projectile cooling cylinder disposed within the runner 1 by means of a compression pump, a piston and other actuating means, the front end 6a extended into the gate 5 is cooled, so that the fused resin in the gate 5 is cooled rapidly, radiated and solidified speedily. Consequently, the gate is closed. Further, during the time when the cooling fluid is supplied forcibly, it is of course possible to stop actuation of the heater 3.

Accordingly, since the solidified resin in the cavity 4 can be taken away immediately by a mold opening operation and the injection molding operation is returned back to the initial position, it is possible to shorten the molding time.

Further, the synthetic resin in the gate 5 at the time of the mold opening operation is solidified locally by means of the forcible cooling operation and the gate is closed, so that any fused resin is entirely prevented to flow into the cavity.

Following this, when a mold clamping operation is initiated, the forcible cooling means A stops its cooling function, thereby the resin in the gate 5 is released from cooling. Namely, it is heated and fused immediately by the heater 3 and the fused resin in the runner 1, thereby the gate is opened.

Accordingly, by means of the aforesaid injection molding operation, the fused resin is filled into the cavity by way of the runner 1 and the gate 5, and the injection molding operation is completed.

Thus, by actuating again the forcible cooling means A, the fused resin in the gate 5 is solidified forcibly and the mold opening operation is carried out to take away the molded article.

By repeating the aforementioned operation, a preferred injection molding can be accomplished.

Figure 3:
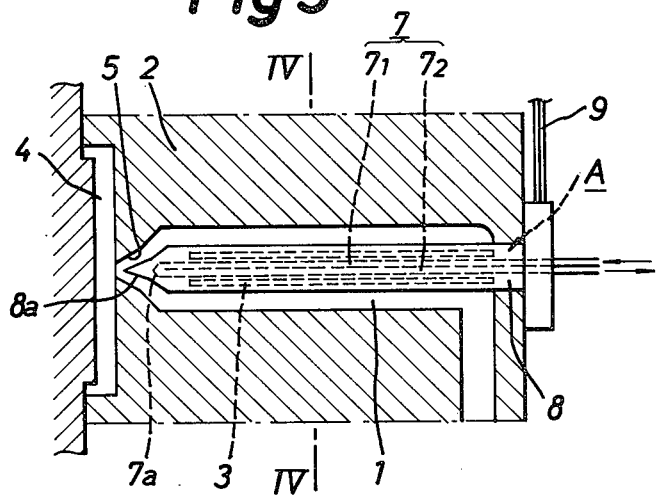
FIG. 3 is a vertical section view of another example of the injection molding apparatus according to this invention.
Figure 4:
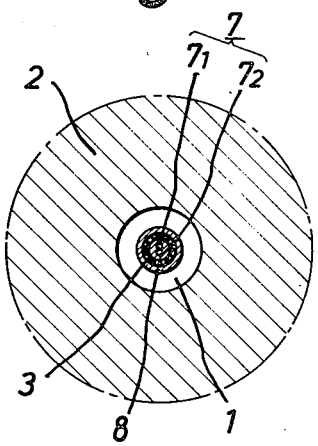
FIG. 4 is a front view taken on line IV—IV of FIG. 3.

Another example of this invention will now be described with reference to FIGS. 3 and 4.

Numeral 8 denotes a projectile cylinder which performs both the heating function and the cooling function.

The projectile cylinder 8 is provided therein with the heater 3 which is energized by an electric wire 9, whereby the resin in the runner 1 and the gate 5 is heated so as to be injectable. Unlike the first example, the heater 3 is disposed within the runner 1.

The forcible cooling means A is arranged in the projectile cylinder 8 in the same manner as described in the first example. Likewise, the fused resin in the gate 5 is cooled locally by the curved portion 7a of the cooling channel 7. Since the cooling function of the forcible cooling means A was described previously, its description will be omitted.

The resin stored in the gate 5 and the runner 1 is constantly heated and fused by the heater 3 incorporated in the projectile cylinder 8. Accordingly, likewise in the first example, by actuating the forcible cooling means A, only the fused resin in the gate 5 can be cooled and solidified locally, thereby the gate 5 is closed. By repeating the aforementioned operation, the injection molding operation can be carried out.

Another example of this invention will now be described with reference to FIGS. 5(a), 5(b), 5(c) and 6(a), 6(b), 6(c).

Numerals 10 and 11 respectively denote a projectile cylinder which also performs both the cooling and heating functions.

Figure 5A:
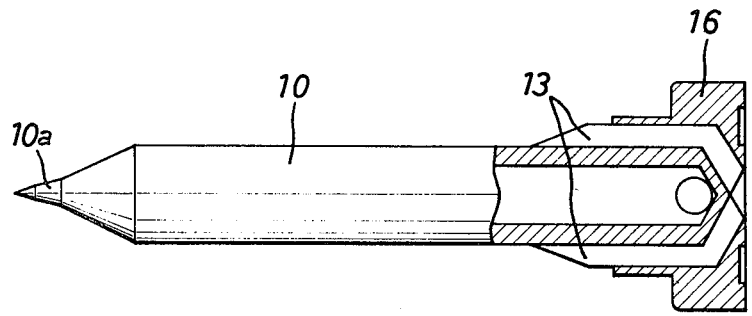
FIG. 5(a) is a partially cutaway plan view of a projectile cylinder to be incorporated in a runner of the injection molding apparatus according to this invention.
Figure 5B:
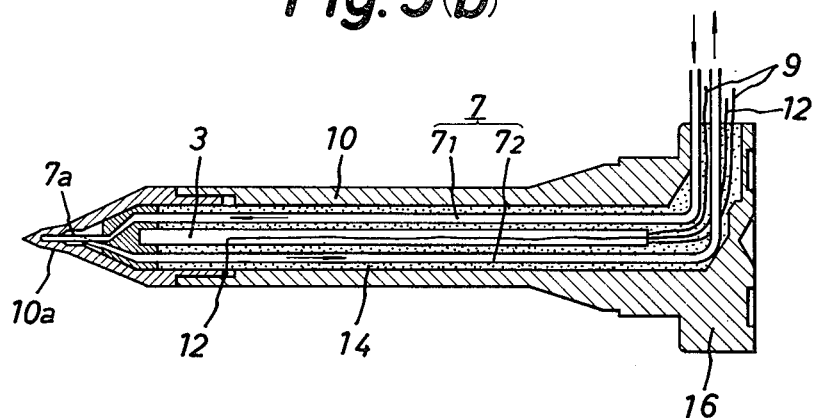
FIG. 5(b) is a vertical section view of the projectile cylinder in FIG. 5(a)
Figure 5C:
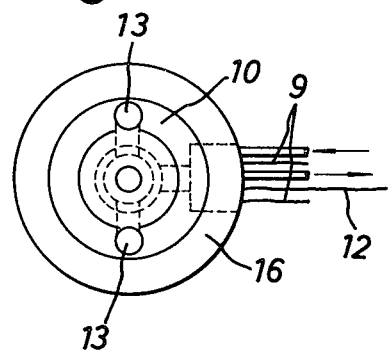
FIG. 5(c) is a front view of the projectile cylinder in FIG. 5(a)

Referring to FIGS. 5(a), 5(b) and FIG. 5(c), the heater 3 is disposed on a center axis of the projectile cylinder 10. Along the heater 3 are disposed in parallel the cooling medium advancing path $7_1$, and the cooling medium returning path $7_2$, both of which are communicated with each other by way of the curved portion 7a. Numeral 12 denotes a temperature sensor which is disposed in a preferred postion of the projectile cylinder 12 in order to maintain the temperature condition constant.

Numeral 13 denotes a passage of fused resin which is communicated with the runner 1. Numeral 14 denotes a heat insulating material.

Figure 6:
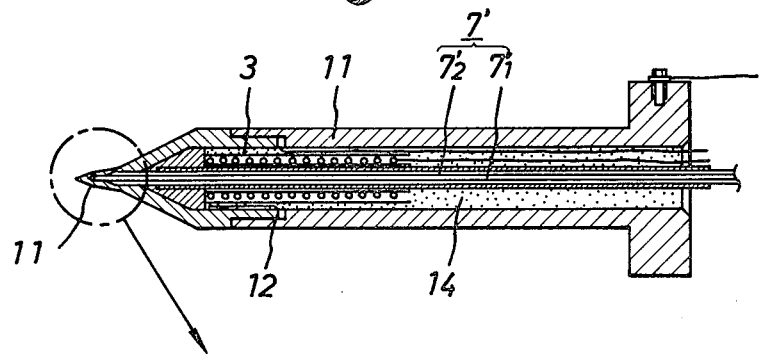
FIG. 6(a) is a vertical section view of another projectile cylinder to be incorporated in a runner of the injection molding apparatus according to this invention.
FIG. 6(b) is an enlarged section view of a pointed part of the projectile cylinder in FIG. 6(a)
FIG. 6(c) is a front view of the projectile cylinder in FIG. 6(a)
Figure 6:
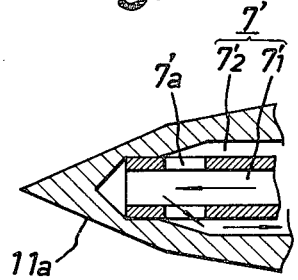
Figure 6:
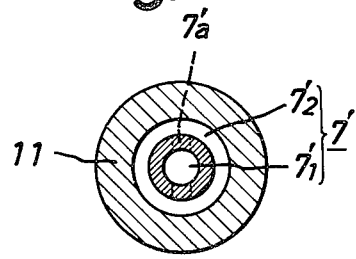

Referring to FIGS. 6(a), 6(b) and 6(c), a cooling channel 7' consists of a cooling medium advancing path $7'_1$ which is formed on a center axis of the projectile cylinder 11, and a cooling medium returning path $7'_2$ which is formed along the outer periphery of the advancing path $7'_1$. Both the advancing path $7'_1$ and the returning path $7'_2$ are communicated with each other by way of an opening $7'a$ which is formed in the proximity of a front end 11a of the projectile cylinder 11. Likewise in the former example, the temperature sensor 12 and the heat insulating material 14 are disposed in the projectile cylinder 11. Accordingly, the fused resin in the gate 5 is cooled and solidified by the cooling channel 7' formed in the front end 11a of the projectile cylinder 11, thereby the gate 5 is closed.

A further example of this invention will now be described with reference to FIG. 7. This example employs a plurality of projectile cylinders 10 shown in FIGS. 5(a), 5(b) and 5(c), wherein a large number of molded articles can be obtained by one injection shot.

Numeral 15 denotes a mold part in which a desired number of cavities 4 are formed and communicated with the gate 5 and the runner 1.

Each of the projectile cylinders 10, 11 in which the cooling channel 7 of the forcible cooling means A, the heater 3, etc. are incorporated may be produced independently of the mold part 15 and disposed on a center axis of the runner 1. Each flange 16 of the cylinders 10 is supported by a support plate 17 and fixed therewith by srews 18.

In the aforesaid examples a pipe conduit cooling medium for passing through the cooling channel 7 is not illustrated, but may be connected to each forcible cooling means A of the projectile cylinder 10 through a switching electromagnetic valve by means of a compression pump or the like. An end of the pipe conduit is, by way of a variable throttle valve, connected to an end opening 19a of a cooling medium inflow passage 19, while another pipe conduit is connected to an end opening 20a of a cooling medium outflow passage 20 to discharge the cooling medium.

The variable throttle valve may be mounted in a position of the pipe conduit for the outflow passage, but not in a position of the pipe conduit for the inflow passage. The switching electromagnetic valve mounted in the pipe conduit for the cooling medium is opened or closed by a timer which is interconnected with each injection cycle.

The support plate 17 is provided with a sprue bush 22 having a contact face 21 for receiving an injection cylinder nozzle. The sprue bush 22 is disposed in the best position of the support plate 17 so that the fused resin can be supplied uniformly into each cavity 4. A sprue 23 is formed through the sprue bush 22 and communicated with the runner 1 and each gate 5.

The operation of this example will now be described.

When carrying out the injection molding operation by connecting the cylinder nozzle of one injection molding machine (not illustrated) to the spure bush 22, the fused resin is injected into each of a plurality of cavities 4 through the runner 1 and the gates 5.

In that case, the resin in the runner 1 and the gates 5 is constantly heated and fused by the heater 3, thereby the injection molding operation is prepared.

As soon as the fused resin is filled in each cavity 4 by the injection molding operation, the electromagnetic valve of the cooling medium pipe conduit is opened and a desired quantity of the cooling medium is supplied into the cooling channel 7 of each cylinder 10. Then, the fused resin in each gate 5 is cooled rapidly, radiated and solidified speedily, thereby each gate 5 is closed.

Thus, the solidified resin in each cavity 4 can be taken away as a molded article by the mold opening operation. Then, the injection molding operation is returned back to the initial position. Since a plurality of cavities 4 are mounted, a plurality of molded articles are produced in each injection shot. This is suitable for the mass production. Further, when the mold clamping operation is carried out, the electromagnetic valve is closed and the forcible cooling means A stops its actuation. Subsequently, the resin in the gate 5 is again heated speedily by the heater 3 and the fused resin in the runner 1, thereby the gate is opened. In this way, the following injection shot is repeated.

As described previously, the front end 10a of the projectile cylinder 10 is extended into the gate 5 and the curved portion 7a of the cooling channel 7 in the projectile cylinder 10 is disposed in the proximity of the front end 10a. Accordingly, every time the injection molding operation is carried out, the fused resin in the gate 5 is cooled and solidified locally by a pointed portion of the projectile cylinder 10, thereby the gate 5 can be closed.

It is to be understood that this invention is not limited to the aforesaid examples. For example, if the cooling channel 7 enables to cool locally the fused resin in the gate 5, any structure of it is available. Further, kind of the cooling medium is not particularly specified. Still further, kind of the driving device for actuating the forcible cooling means A is also not specified. Namely, a compression pump, a piston or the like is available if it enables to interconnect with the injection molding operation.

According to one aspect of this invention, the synthetic resin in the runner is heated constantly inwardly of the runner or outwardly thereof by the heater, whereby that in the runner and the gate is placed under the fused condition. On the other hand, every time the injection molding operation is carried out, it is possible to cool only the gate area by means of the forcible cooling means and solidify the fused resin in the gate. Thus, the gate is closed firmly. Accordingly, any resin filled in the cavity is not permitted to flow back into the runner in connection with the return of the plunger means for the injection operation, so that each of the molded articles is precise and uniform in shape. Further, it is possible to shorten the molding time. Further, since it is unnecessary to mount means for transforming the voltage of a power source of this injection molding apparatus, it is feasible to make the apparatus compact and produce it at a lower cost.

Still further, since it is optional to regulate a caliber of the gate, various molded articles including larger or smaller sizes can be produced.

Moreover, the present invention enables to produce highly precise molded articles.

What is claimed is:

1. A process for injection molding a fused synthetic resin into a cavity comprising the steps of:
   heating and fusing a synthetic resin in a runner and a gate which communicate with each other;
   injecting fused synthetic resin from said runner and gate into a cavity which communicates with said gate; and
   forcibly supplying a cooling medium into a cooling chamber projecting into the runner and the interior of the gate;
   whereby the fused synthetic resin is cooled and solidified within the gate to close the gate after the resin has been injected into the cavity.

2. An injection molding apparatus for synthetic resin comprising:
   a pair of molds defining a cavity;
   a gate communicating with said cavity;
   a runner communicating with said gate;
   heater means for heating and fusing resin in the gate and the runner;
   cooling means disposed in said runner and extending into said gate for locally cooling the area of the gate; and
   actuating means to actuate the cooling means every time an injection molding operation is carried out whereby fused resin in the gate can be cooled and solidified in order to close the gate.

3. The injection molding apparatus of claim 2, wherein said cooling means comprises a projectile cylinder having a cooling channel, said projectile cylinder disposed in said runner with the front end thereof extending into said gate, whereby the gate is cooled locally by the front end of said cooling channel.

4. The injection molding apparatus of claim 3, wherein said heater means is incorporated within said projectile cylinder.

* * * * *